United States Patent
Nowlin, Jr. et al.

(10) Patent No.: US 6,484,309 B2
(45) Date of Patent: *Nov. 19, 2002

(54) ENABLING SOFTWARE DESIGNED FOR ONE OPERATING SYSTEM TO OPERATE ON ANOTHER OPERATING SYSTEM

(75) Inventors: Dan H. Nowlin, Jr., Hillsboro; Kelan C. Silvester, Portland, both of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,592

(22) Filed: Oct. 8, 1998

(65) Prior Publication Data

US 2002/0066085 A1 May 30, 2002

(51) Int. Cl.[7] .................................................. G06F 9/44
(52) U.S. Cl. ..................... 717/100; 717/106; 717/137
(58) Field of Search ........................... 717/1, 3, 5, 100, 717/136, 137, 138, 140, 7, 10, 11; 707/104; 703/26, 2, 100, 13, 21, 22, 23, 24, 27; 709/328, 220, 319, 329; 345/746

(56) References Cited

U.S. PATENT DOCUMENTS

| | | | | |
|---|---|---|---|---|
| 4,553,205 A | * | 11/1985 | Porchia | 717/136 |
| 4,591,975 A | * | 5/1986 | Wade et al. | 710/260 |
| 5,666,293 A | * | 9/1997 | Metz et al. | 709/220 |
| 5,678,044 A | * | 10/1997 | Pastilha et al. | 707/104.1 |
| 5,831,609 A | * | 11/1998 | London et al. | 345/746 |
| 5,896,535 A | * | 4/1999 | Ronström | 717/131 |
| 5,974,470 A | * | 10/1999 | Hammond | 709/331 |
| 6,031,988 A | * | 2/2000 | Nakashima | 703/26 |
| 6,071,317 A | * | 6/2000 | Nagel | 717/128 |
| 6,145,014 A | * | 11/2000 | Chong | 709/328 |
| 6,154,773 A | * | 11/2000 | Roberts et al. | 709/219 |
| 6,188,975 B1 | * | 2/2001 | Gay | 703/22 |
| 6,263,492 B1 | * | 7/2001 | Fraley et al. | 717/107 |
| 6,295,645 B1 | * | 9/2001 | Brewer | 717/178 |
| 6,311,058 B1 | * | 10/2001 | Wecker et al. | 455/418 |
| 6,314,530 B1 | * | 11/2001 | Mann | 714/38 |
| 6,327,594 B1 | * | 12/2001 | Van Huben et al. | 707/200 |

* cited by examiner

Primary Examiner—Kakali Chaki
Assistant Examiner—Hoang-Vu Antony Nguyen-Ba
(74) Attorney, Agent, or Firm—Trop, Pruner & Hu, P.C.

(57) ABSTRACT

A system converts an application designed to run on one operating system so that it can run on a second operating system without recompiling. An application designed to run on Windows® 95, 98 or NT, for example, may be converted so that it will operate without recompiling on a Windows® CE operating system machine.

30 Claims, 12 Drawing Sheets

ENABLING SOFTWARE DESIGNED FOR ONE OPERATING SYSTEM TO OPERATE ON ANOTHER OPERATING SYSTEM

BACKGROUND

This invention relates generally to operating systems and particularly to systems for converting software designed to operate on one operating system, such as Windows® 95 or Windows® NT, to run on another operating system, such as Windows® CE.

Microsoft® Windows® CE is a 32 bit operating system designed particularly for use with small computers such as handheld and palmtop computers. Handheld and palmtop computers are a class of computers with relatively limited capabilities, designed to be smaller than portable, laptop or notebook computers in size. Thus, the Windows® CE operating system is smaller, in terms of memory footprint and functionality, than other Windows® operating systems. Many of the components of Windows® CE are modular so that a system developer may use certain portions of the operating system as needed.

Windows® CE uses a subset of the Windows® 32 bit application program interfaces (API). Developers of Windows® CE software can use the same development tools that are used for other Windows® 32 bit applications.

Software that is designed to operate with the Windows® 95 and NT operating systems cannot be used with the Windows® CE operating system without recompiling source code, and in most cases without rewriting source code. This means the amount of software available for use in Windows® CE machines is relatively limited compared to that for other Windows® operating systems.

While Microsoft suggests that Windows® 95 programs may be ported to Windows® CE (see "Porting Windows® 95 Programs to Windows CE" at http//www.microsoft.com/Windowsce/embedded/techpapers/wce20/porting.asp), Microsoft concedes that rewriting and recompiling source code is necessary. Thus, there is a tremendous demand for a system that enables other Windows® 32 bit applications to be used with the Windows® CE operating system.

SUMMARY

In one embodiment, a method of converting software to run on different operating systems includes loading software on a first computer system having a non-Windows CE operating system. The software is translated to run on a second computer system, having a Windows® CE operating system, without recompiling the source code. This software then may be transferred to a second computer system running a Windows® CE operating system.

DETAILED DESCRIPTION

Figure 1:
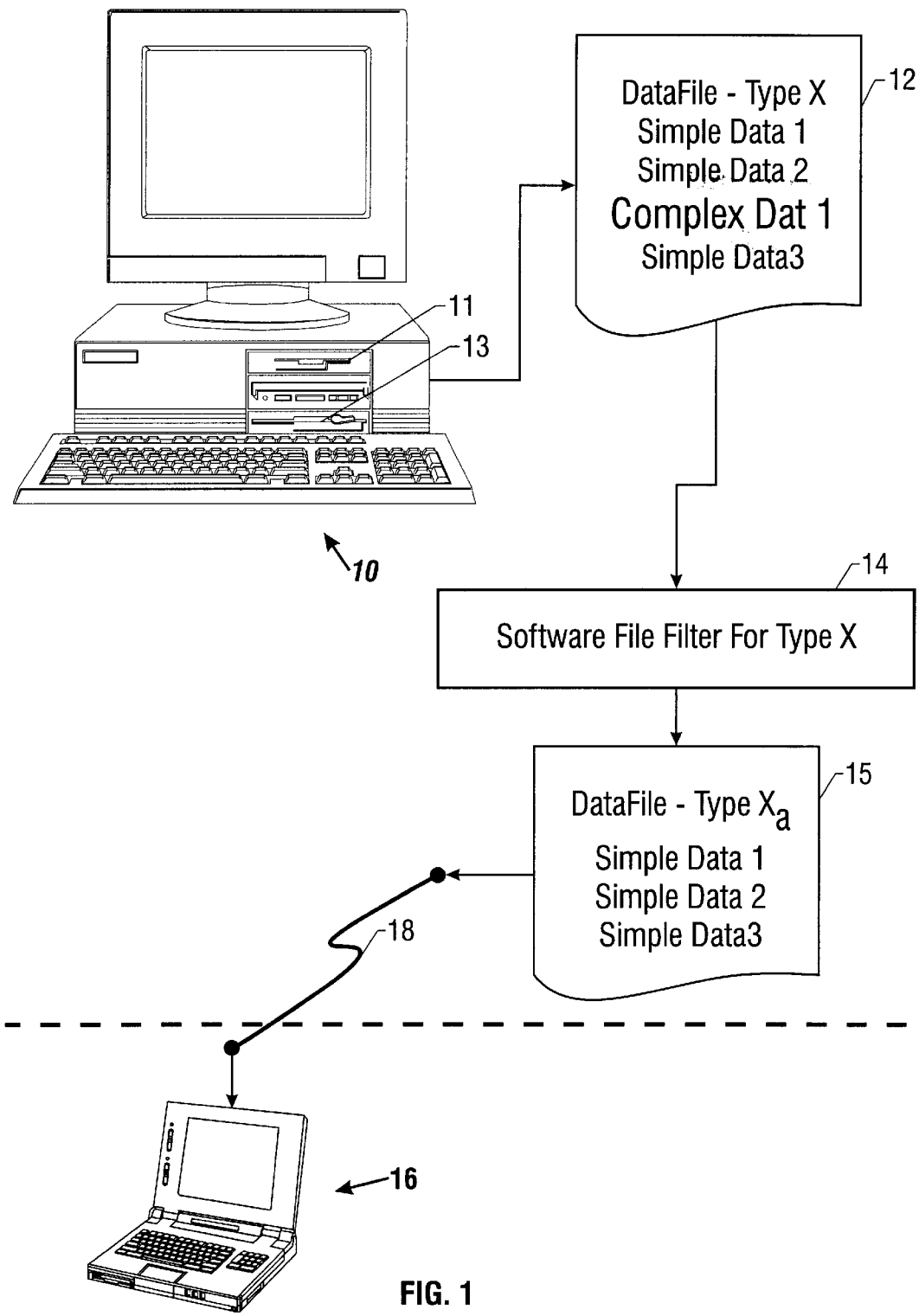
FIG. 1 is a partially exploded, partially diagrammatic front elevational view of a pair of coupled computers, one adapted to run one Windows® 32 bit operating system and the other designed to run the Windows® CE operating system in accordance with one embodiment of the present invention.

Referring to FIG. 1, a first computer system 10, that includes storage devices 11 and 13, may be coupled by a serial cable 18 or wireless connection to a second computer system such as the handheld computer 16 which may be contained in an optional docking bay (not shown). The system 10 may receive software in the form of compact disks (CD-ROMs) and floppy disks on the storage devices 11 and 13 which may be operated to transfer software to system memory for execution. Generally the handheld computer 16 has no such storage devices and thus relies on a host computer, such as the computer 10, for software loading.

The computer system 10 may operate with a Windows® 32 bit conventional operating system such as Windows® 95, Windows® 98 or Windows® NT (hereinafter collectively referred to as Win9X). The handheld computer 16 may operate with the Windows® CE operating system which is generally considered to be incompatible with software adapted for a Win9X operating system.

The system 10 may create data files of one type (e.g., type X) and data (as indicated at 12), including complex data. The system may use a software file filter 14 for type X data files (block 14) to remove or change information to form a temporary data file of a different type (e.g., type Xa) with a simple data structure (as indicated at 15). A variety of wired or wireless transports, including serial cable, infrared, and radio wave as examples, may be used to implement the transfer.

Figure 2:
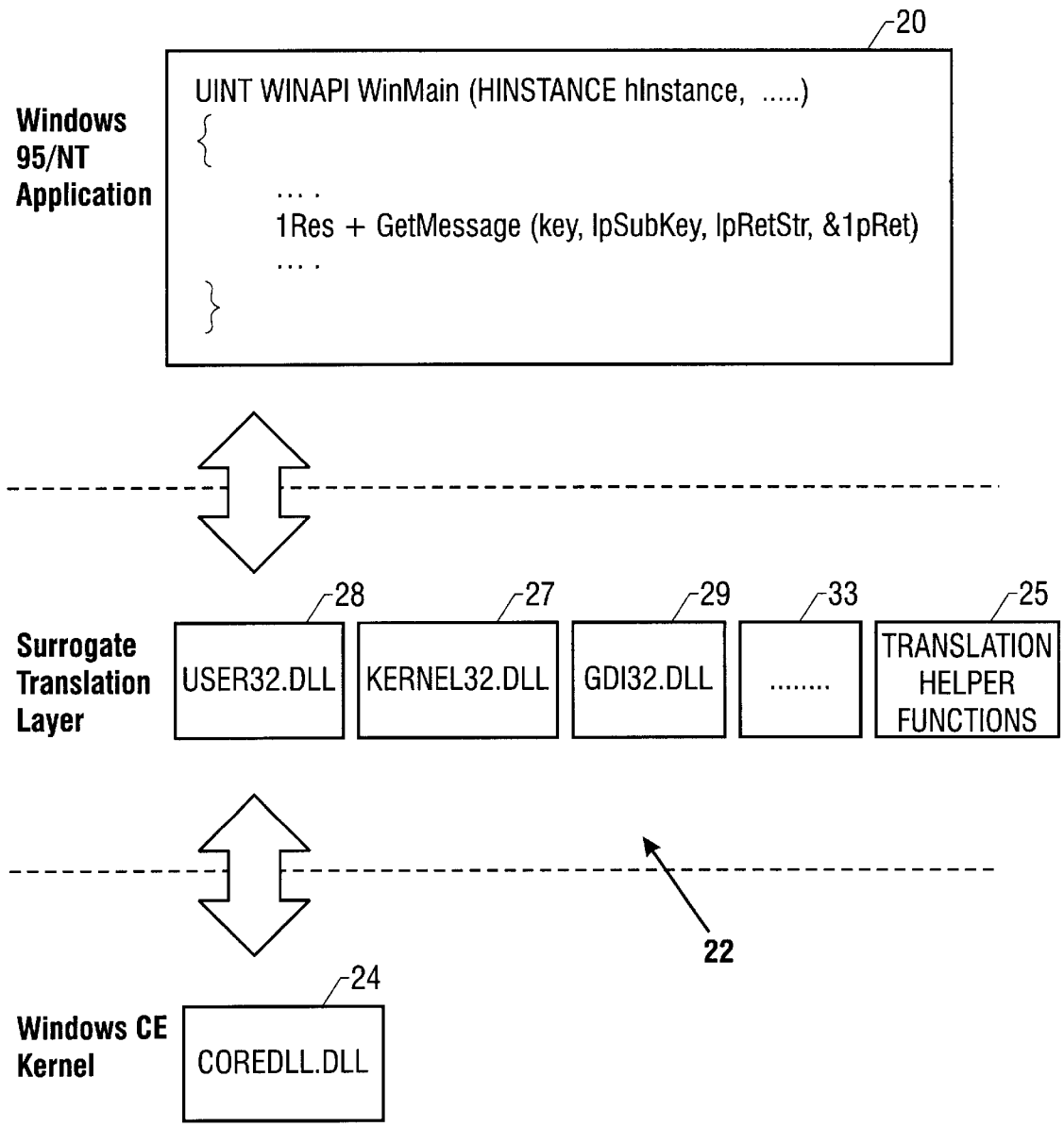
FIG. 2 is a high level depiction of a technique for enabling other non-Windows® CE 32 bit applications to run on the Windows® CE operating system.

Referring to FIG. 2, a system for converting core API calls between a Win9X application 20 and the Windows® CE kernel 24 uses a surrogate translation layer 22. In Windows® CE operating systems, the basic, core APIs are contained within the file in COREDLL.DLL 24. Within a Win9X system, the same APIs are typically distributed between files such as KERNEL32.DLL 27, USER32.DLL 28, GDI32.DLL 29 and others 33. KERNEL32.DLL includes functions for managing memory, processes and threads. USER32.DLL includes functions for performing user interface tasks such as Windows® creations. GDI32.DLL includes functions for drawing graphical images and displaying text.

A Win9X application may run on a Windows® CE machine by calling the Windows® 32 bit APIs in the file COREDLL.DLL via the layer 22. The layer 22 provides surrogate files such as KERNEL32.DLL, USER32.DLL and GDI32.DLL. This means that the import tables of the applications and the DLLs may remain unchanged since they find the APIs they need in the surrogate DLLs as expected. Entries are added to an import table by a linker, to allow an executable to call functions within a DLL.

A surrogate set of Win9X kernel files contained in the layer 22 are compiled and built for Windows® CE to manage the differences in calling conventions. That is, the Win9X applications use the standard calling convention (_stdcall), in which arguments are pushed onto the stack right to left and the API itself cleans up the arguments off the stack. This is different than the Windows® CE calling convention where arguments are pushed onto the stack right to left and the calling software routine cleans up the stack. Thus, in communications between the application 20 and the layer 22, the standard calling convention is utilized as indicated by the upper set of arrows in FIGS. 2 and 3. Between the layer 22 and the Windows® CE kernel 24, the normal Windows® CE, C calling convention (_cdecl) is used.

Figure 3:
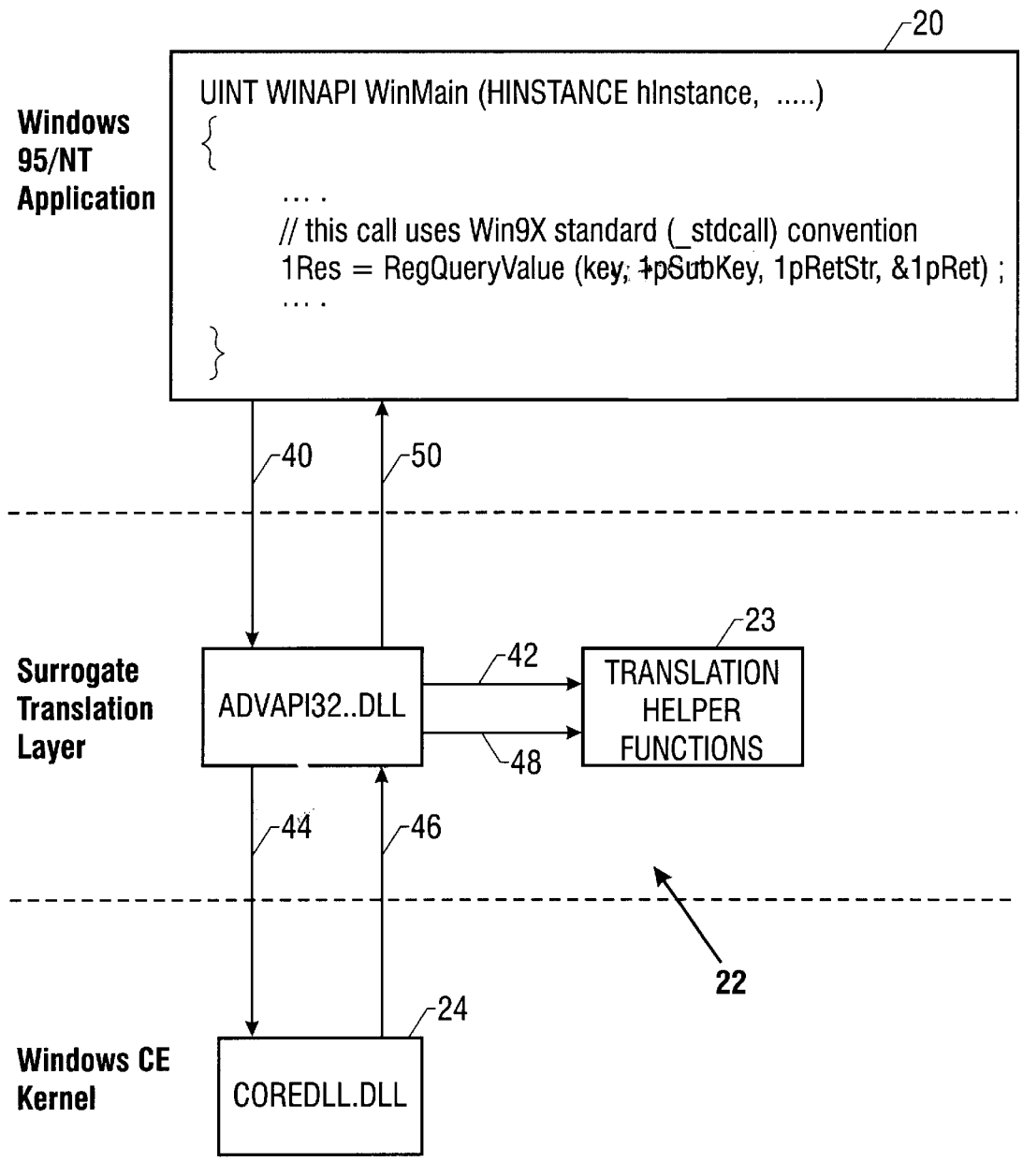
FIG. 3 is a diagram showing how ASCII strings may be converted to Unicode in the embodiment shown in FIG. 2.

Since Windows® CE supports only Unicode strings and Windows 95 applications typically use ASCII strings, it is necessary to perform translations of these string types where appropriate, as illustrated in FIG. 3. The Win9X operating system uses ASCII strings which are 8 bits per character while Windows® CE uses only Unicode strings which are 16 bits per character.

A collaborating set 23 of kernel files contained in the conversion layer 22 handles translations between ASCII and Unicode and Unicode and ASCII as necessary. These conversions may be unnecessary in Windows® NT applications that use Unicode strings. Because of the differences in the usage of string types, all the ASCII strings are converted to Unicode so that they may be properly passed to Windows® CE APIs.

Referring to FIG. 3, the application calls the ASCII version of RegQueryValue which is routed through the translation layer, as indicated by the arrow 40. The call uses the standard calling convention. The translation layer converts the ASCII value name string to Unicode as indicated at 42 using ADVAPI32.DLL.

Since RegQueryValue is not supported in Windows® CE, the translation layer 22 calls RegQueryValueEx which resides in the Windows® CE kernel 24 as indicated at 44. This call uses the C calling convention. Windows® CE returns the registry value as a Unicode string as indicated at 46. The translation layer 22 converts the registry value string from Unicode to ASCII as indicated at 48. The translation layer 22 then returns the ASCII string back to the calling application as indicated at 50.

In addition to performing string conversions, the conversion layer 22 may also supplement essential API support for functions that are not supported in Windows® CE. Thus, this method makes it possible to support all the features of Win9X operating systems in Windows® CE. Finally, the surrogate files provide the expected DLL file names as indicated by the executable import table.

Figure 4:
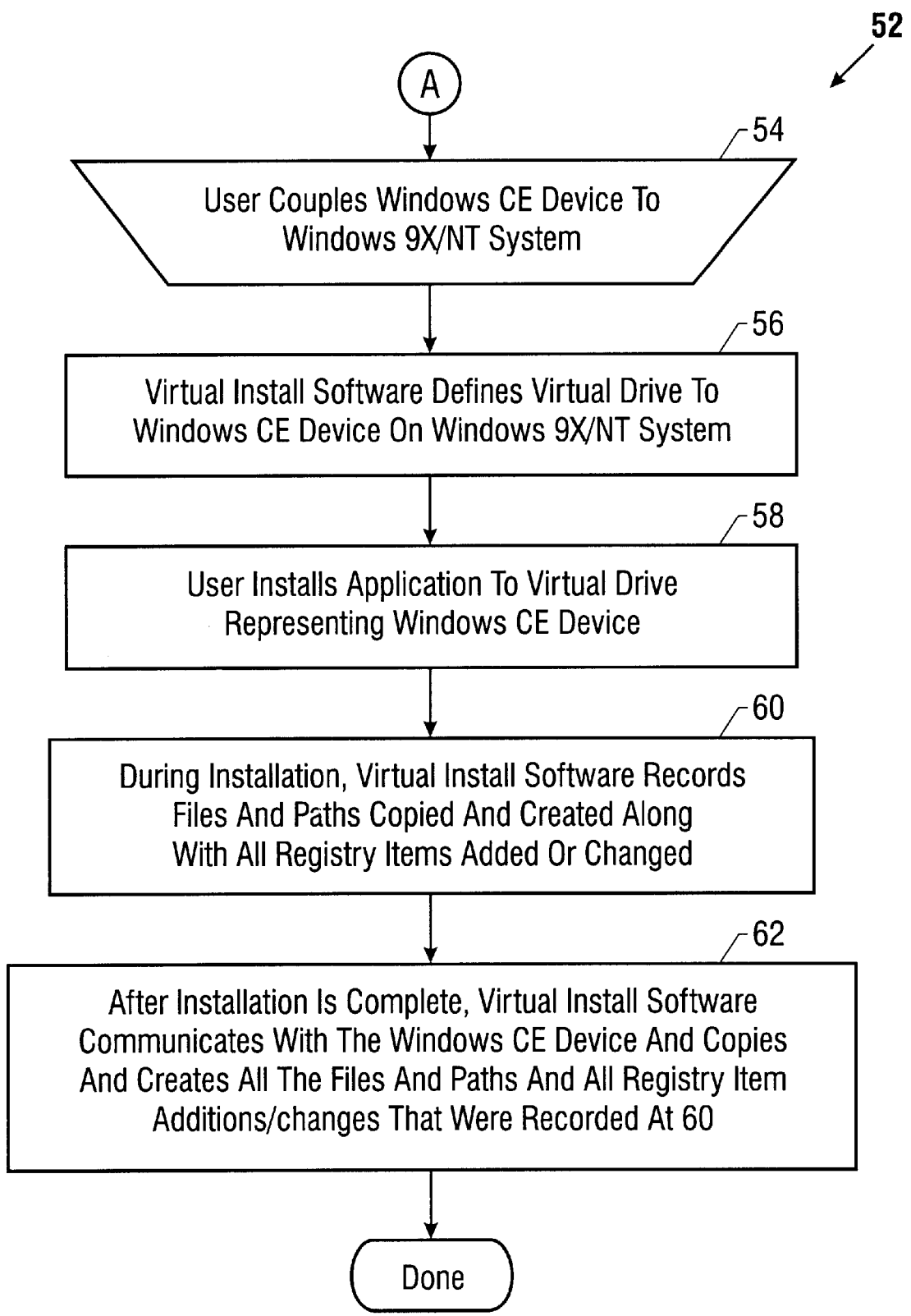
FIG. 4 is a flow chart describing the flow of the virtual installation software used in one embodiment.

Referring to FIG. 4, the software 52 allows for virtual program installation of a Win9X application to a coupled Windows® CE device (block 54). Referring to block 56, initially virtual install software is used to define a virtual drive to the Windows® CE device defined on the Win9X system. The user may then be prompted to install the Win9X application to a virtual drive representing the Windows® CE device at the destination, as indicated in block 58. During installation, virtual install software records files and paths are copied and created in the Win9X system along with all added or changed registry items, as shown in block 60.

After installation, the virtual install software communicates with the Windows® CE device and copies and creates all the files, paths and all the registry item additions or changes that were recorded previously, as indicated in block 62. The recorded registry information and software associations are moved from the virtual installation over to the attached Windows® CE system as indicated in block 62. As explained hereinafter, the executables, DLLs and other files installed on the virtual drive are converted to the Windows® CE system.

Figure 5:
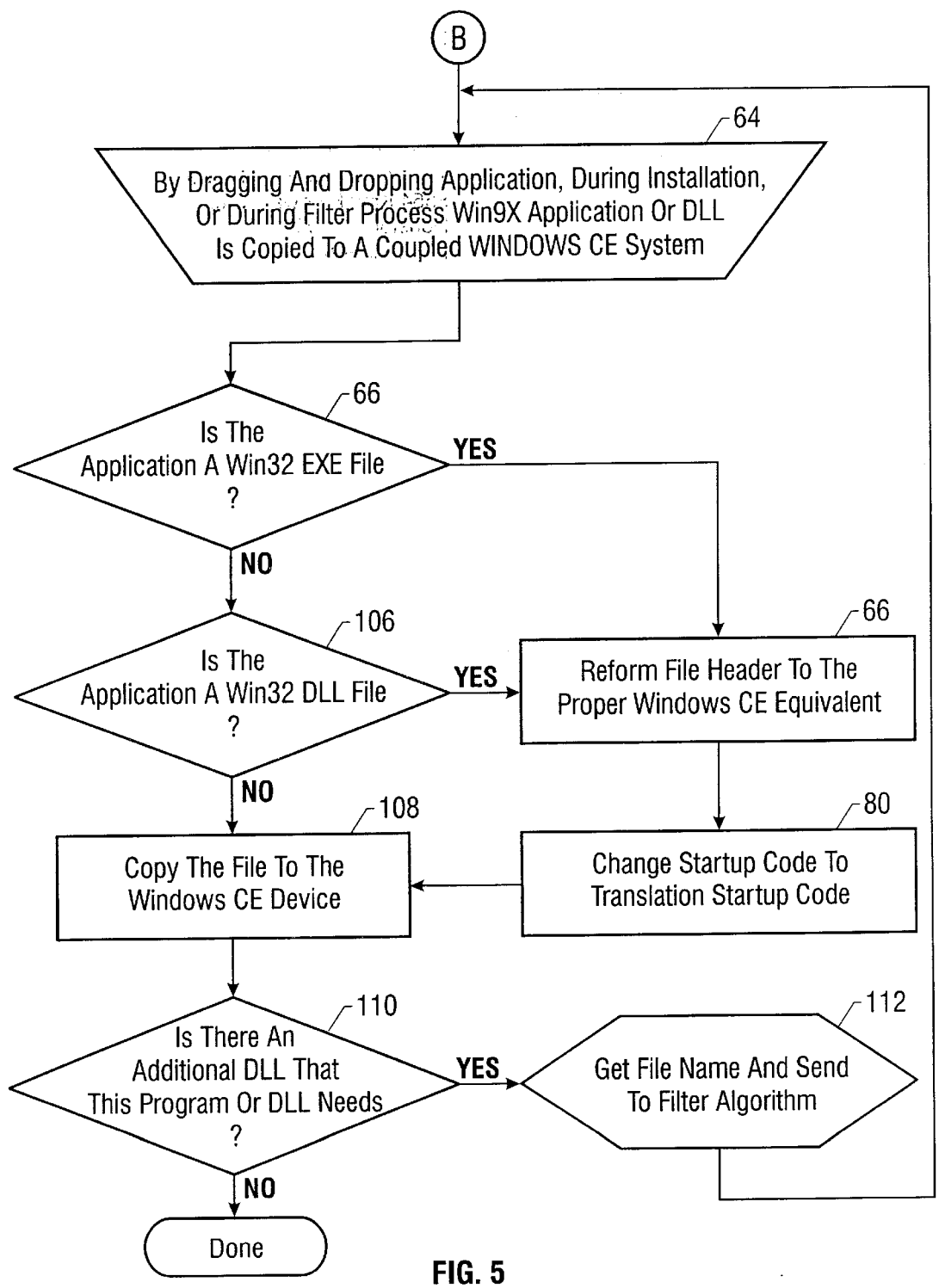
FIG. 5 is a continuation of the flow chart shown in FIG. 4.

Continuing in FIG. 5, a Win9X application may be dragged and dropped to the coupled Windows® CE system, as shown at 64 either during installation or during the filter process. A Win9X application or DLL is copied to the coupled Windows® CE system. A check at diamond 66 determines whether the application includes a Win9X executable file.

File formats used by the Windows® CE operating system and Windows® CE-based applications are generally different from the file formats used in corresponding Win9X-based applications. For example, PowerPoint files need to be translated to a less rich format when downloaded to a Windows® CE device because the Pocket PowerPoint viewer on the Windows® CE device does not have the full capabilities that exist on a Win9X equipped computer system.

To deal with these types of issues, the computer 10 includes software stored in memory that enables Win9X files to be transferred to the Windows® CE device 16. Developers can create and register special file transfer filters for any file type whenever a file format change is necessary while transferring the file to a Windows® CE system.

A file filter is a dynamic link library (DLL) that is an additional piece of software added to the desktop's operating system, usually by installing the Windows® CE services shipped with the Windows® CE device. DLLs are files containing code that can be shared among applications and processes. The file filter controls the transfer of data between the Win9X system and the Windows® CE system. The filter automatically converts the files as they are transferred.

Figure 9:
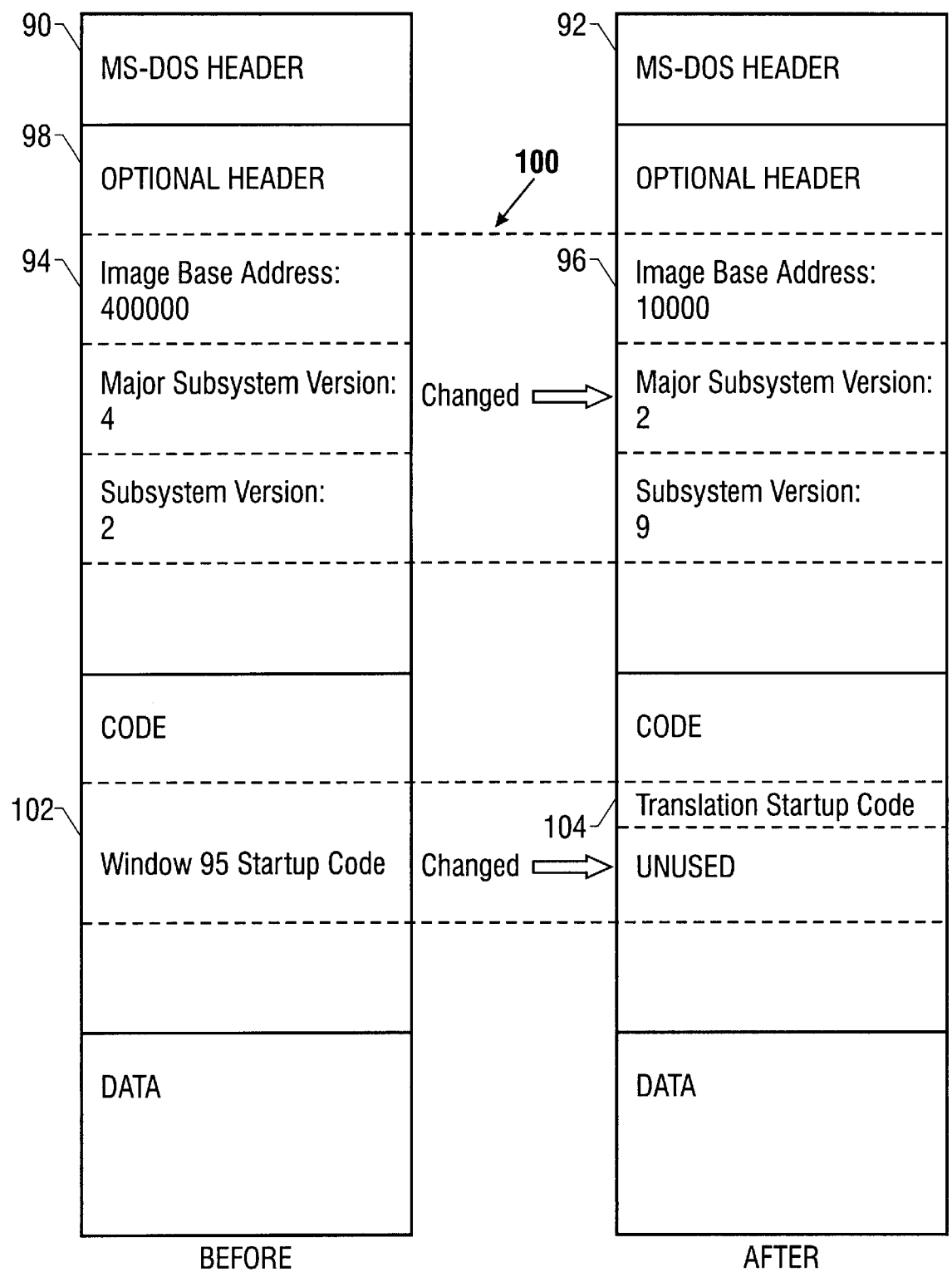
FIG. 9 is a diagram showing the translation of an executable file by the file filter in accordance with one embodiment of the present invention.

FIG. 9 shows an example of a typical filter process. The data 90 is created and once its transfer to the Windows® CE device has begun, it passes through a filter where the data is transformed in any way the filter deems necessary. Once the alterations are finished, the filter creates a temporary file 92 with the new format. This temporary file is then transferred over the communications mechanism to the Windows® CE device. Once the file reaches the Windows® CE device, receiving software stores it to memory and/or non-volatile storage.

A defined file filter resolves the differences between Win9X executables and dynamic link libraries (DLLs) and counter part Windows® CE executables and DLLs. This allows the Windows® CE loader to find these Win9X components compatible for loading and executing.

The file filter mechanism may be used to change the necessary bytes in the executable to run on a Windows® CE machine with the Win9X layer 22. When an application is dropped to a Windows® CE device, the filter checks the type of application. If the application is a Windows® CE application, the file is copied without change. If it is a Win9X application, then the file filter parses the executable and changes the bytes appropriately to run on Windows® CE.

During the filter process, Win9X executables and DLLs can be patched so that they appear to be native Windows®

CE executables and DLLs to the loader. Other issues can be addressed during the filter process such as dealing with memory issues in executables.

Win9X applications start at memory addresses 94 above the one megabyte range (i.e., greater than 100000H) to allow the Disk Operating System (DOS) and Basic Input/Output System (BIOS) memory to be mapped in the lower one megabyte of virtual address space. Under Windows® CE, since there is no legacy support for DOS or BIOS, applications typically load much lower, generally at 10000H as indicated at 96. If an application running on a Windows® CE system attempts to load at 100000H or higher (Win9X load area), the loader recognizes this attempt as a non-Windows® CE application and terminates the application with an error message.

The base address 94 of an application is defined at link time and stored in a portable executable header 98 of the application. The portable executable format, developed for executables and DLLs, includes headers containing important information about a file. However, just changing this header is not enough since all addresses within the executable may need to be modified based on the base address. The ImageBase field 94 in the portable executable header 98 of Windows® executable files indicates the virtual base address where a file image gets loaded.

For executable files, the base address is guaranteed. Thus, the linker modifies up all the internal addresses based on this guaranteed base address. Changing the base address requires that all the pre-modified addresses be changed to reflect the new base address. If the ImageBase field is changed to a Windows® CE compatible value, as indicated at 100, the Windows® CE operating system treats the file as though it were a Windows® CE file.

The file filter records the original ImageBase address field that is found in the portable executable optional header. The file filter replaces the address with one that the Windows® CE loader finds acceptable. This allows the image of the application to actually load. Since a linker may modify the global variable and function locations, these fixed up addresses must be modified if the application is going to actually be able to run.

Figure 12:
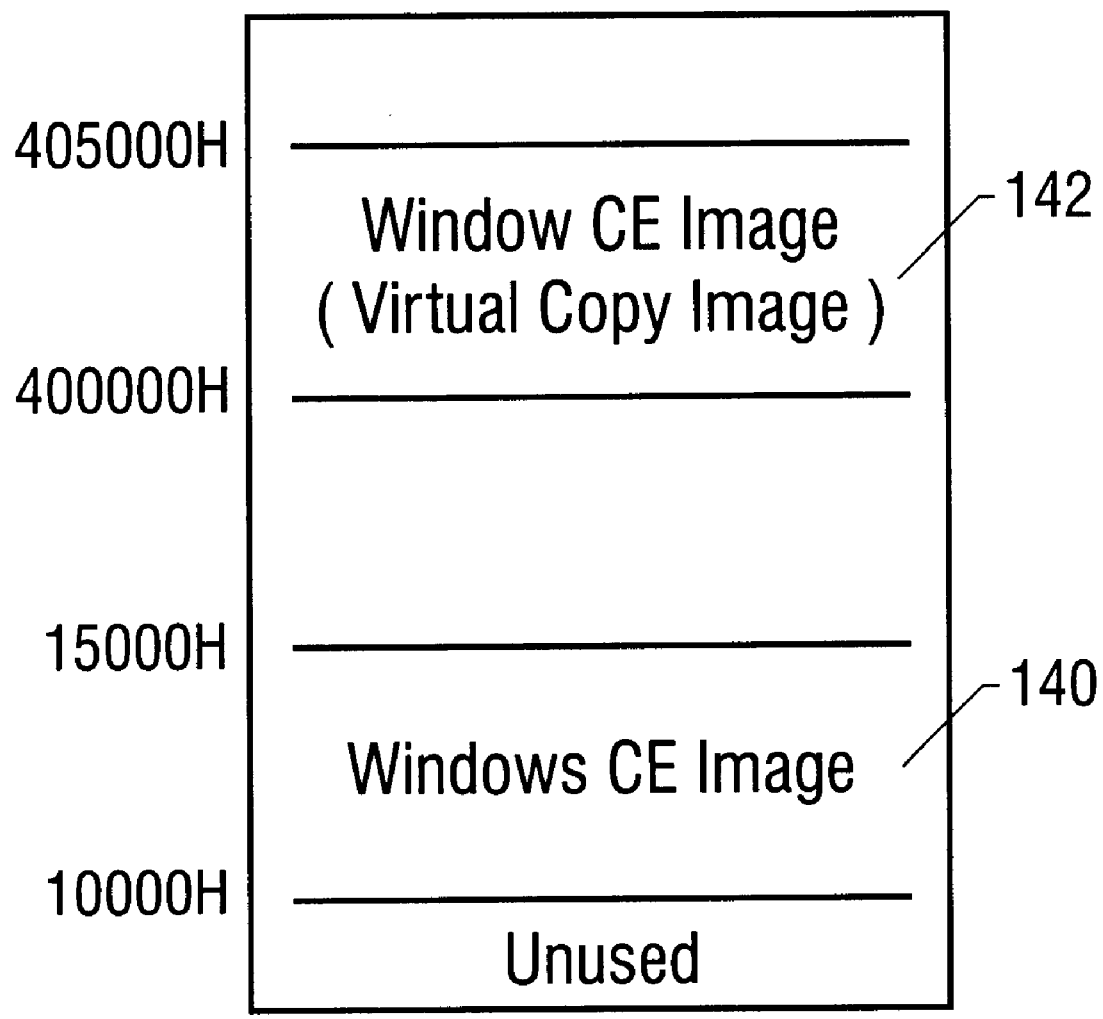
FIG. 12 is a memory map for one embodiment of the invention.

By using the paging mechanism of Intel x86 processors, the image of the application may appear in two places, one where Windows® CE expects to find it (a new ImageBase address 96) and the other where the application expects to find it (the original base address 94) as indicated in FIG. 12 at 140 and 142 and at block 66 of FIG. 5. As shown in FIG. 12, the Windows® CE image may be contained in the region 140 from 10000H to 15000H while a shadow image 142 may be contained at 400000H to 405000H. The shadow image is made with new startup code that replaces the original startup code. This new startup code uses the Windows® CE functions VirtualAlloc and VirtualCopy to perform the page copying.

Figure 7:
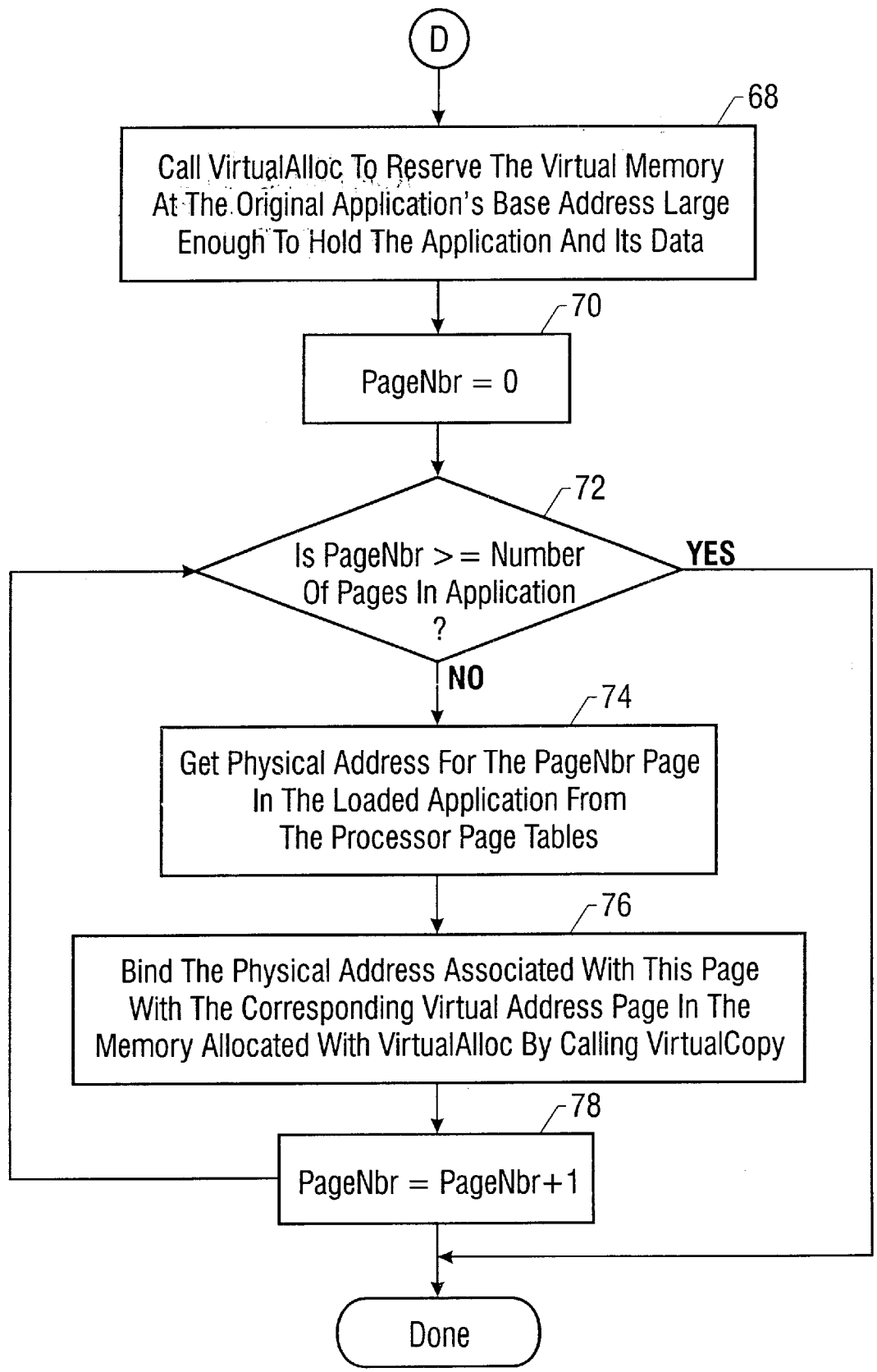
FIG. 7 is a flow chart showing a flow for copying application memory.

Referring to FIG. 7, software for using paging to cause the image of the application to appear in two memory locations, involves calling the VirtualAlloc function to reserve enough virtual memory space at the application's original base address to hold the application and its data, as indicted in block 68. Next, a page number variable is initialized, as indicated in block 70.

At diamond 72, a check determines whether the page number variable is greater than the number of pages in the application. If so, VirtualAlloc has reserved the virtual memory space of sufficient size and the flow may end. Otherwise, the physical address for the page equal to the page number variable in the loaded application is obtained from the processor page tables as indicated in block 74. The physical address associated with the page is bound with the corresponding virtual address page in the memory allocated with VirtualAlloc by calling VirtualCopy, as indicated in block 76. Next, the page number variable is incremented as indicated in block 78 and the flow cycles back to diamond 72. The flow continues until the page number is greater than or equal to the number of pages in the application.

Startup code resides in an application and is called by an operating system as the program execution is initiated. The startup code is executed before the WinMain entry point is called. WinMain is the code procedure which is actually written for the particular application involved. Typically, an application creates its own heap space and performs other startup tasks through execution of the startup code. A heap is a region of reserved address space.

The original startup code of the Win9X application is replaced during the file filtering as indicated at 80 in FIG. 5, and at block 102 in FIG. 9. The code may be replaced by a section of code 104 in FIG. 9 that calls a function (for example, Win95onCEStartup) in the KERNEL32.DLL file that virtually copies the application memory from the Windows® CE address to the original Win9X address (as illustrated in FIG. 7). If the call to the function is successful, then the original WinMain function is called. The WinMain function is called by the startup code to begin execution of a graphical user interface-based application.

By detecting the startup code signatures, one can implicitly know where the call to WinMain is made. The startup code may be different depending on what compiler and link libraries were used when creating the application. The startup code, called before any of the application code is run, may be different for each compiler or library. There is no way to know explicitly where the call to WinMain resides in the startup code. The operating system knows where to enter the application, but it cannot determine where the call to WinMain occurs.

A similar technique can be used to find the DLLMain entry point in a DLL.

By looking at different versions of startup code for different libraries and different compilers, one can determine where the call to WinMain or DLLMain occurs in each of these cases. A database may be provided which correlates these likely locations. For example, it can be determined that in some cases in a certain code location, one will find certain lines of code and the call to WinMain or DLLMain will occur within so many bytes after those lines of code. This deductive information can be compiled in a database.

Figure 8:
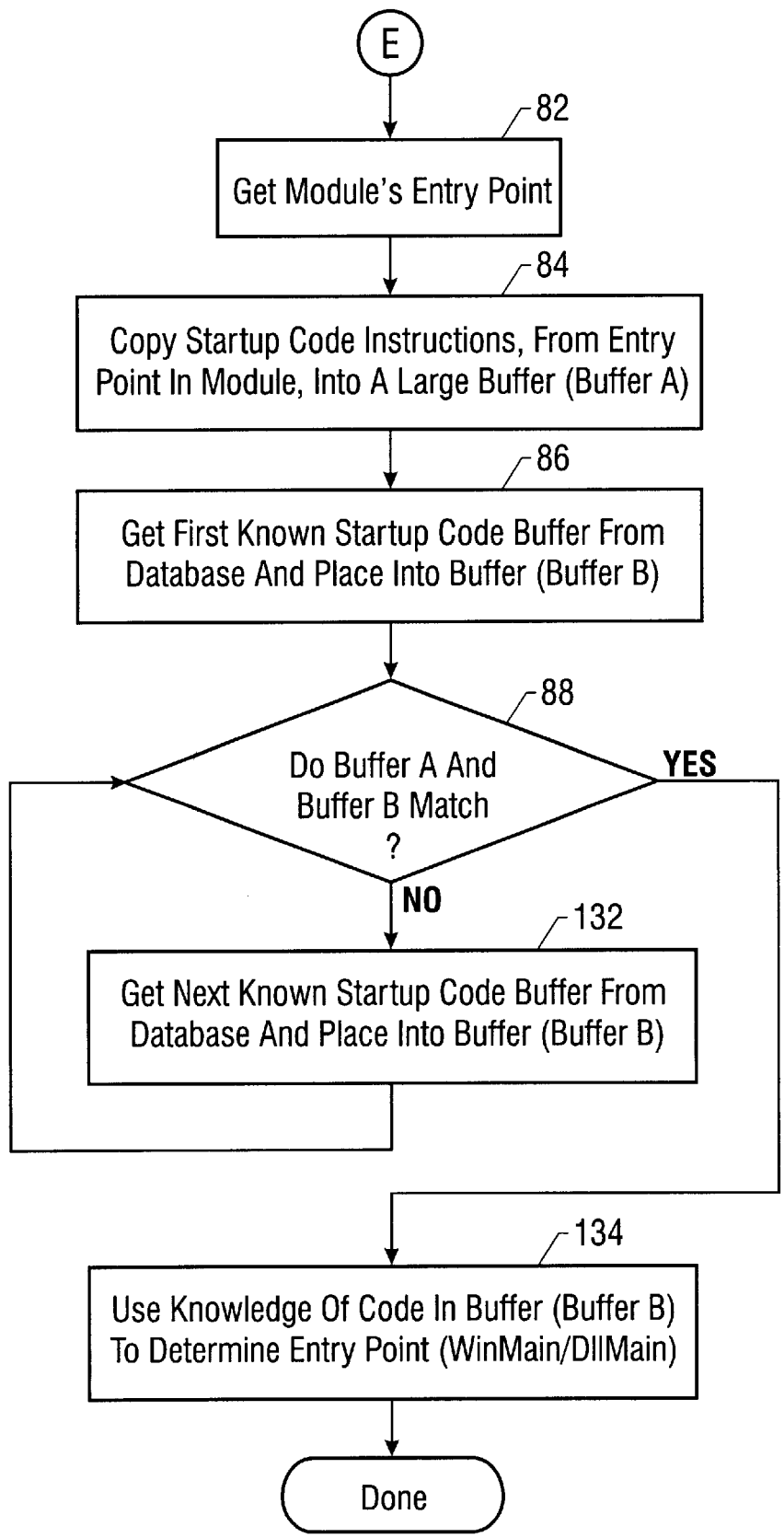
FIG. 8 is a flow chart showing how the WinMain or DLL Main entry point may be identified.

Referring to FIG. 8, initially a module's entry point is obtained as indicated in block 82. Next, the startup code instructions are copied from the entry point in the module into a large buffer which may be termed buffer A as indicated in block 84. Then the first known startup code buffer is obtained from a database and placed into a buffer B as indicated in block 86.

At diamond 88, a check determines whether the buffer A and the buffer B match. If not, the next known startup code buffer from the database is obtained and placed into the buffer B, as indicated on block 132. If the buffer A and the buffer B match, the knowledge of the code in buffer B is used to determine the entry point for WinMain or in the case where the entry point DLLMain is used the entry point to DLLMain is determined as indicated in block 134.

Figure 10:
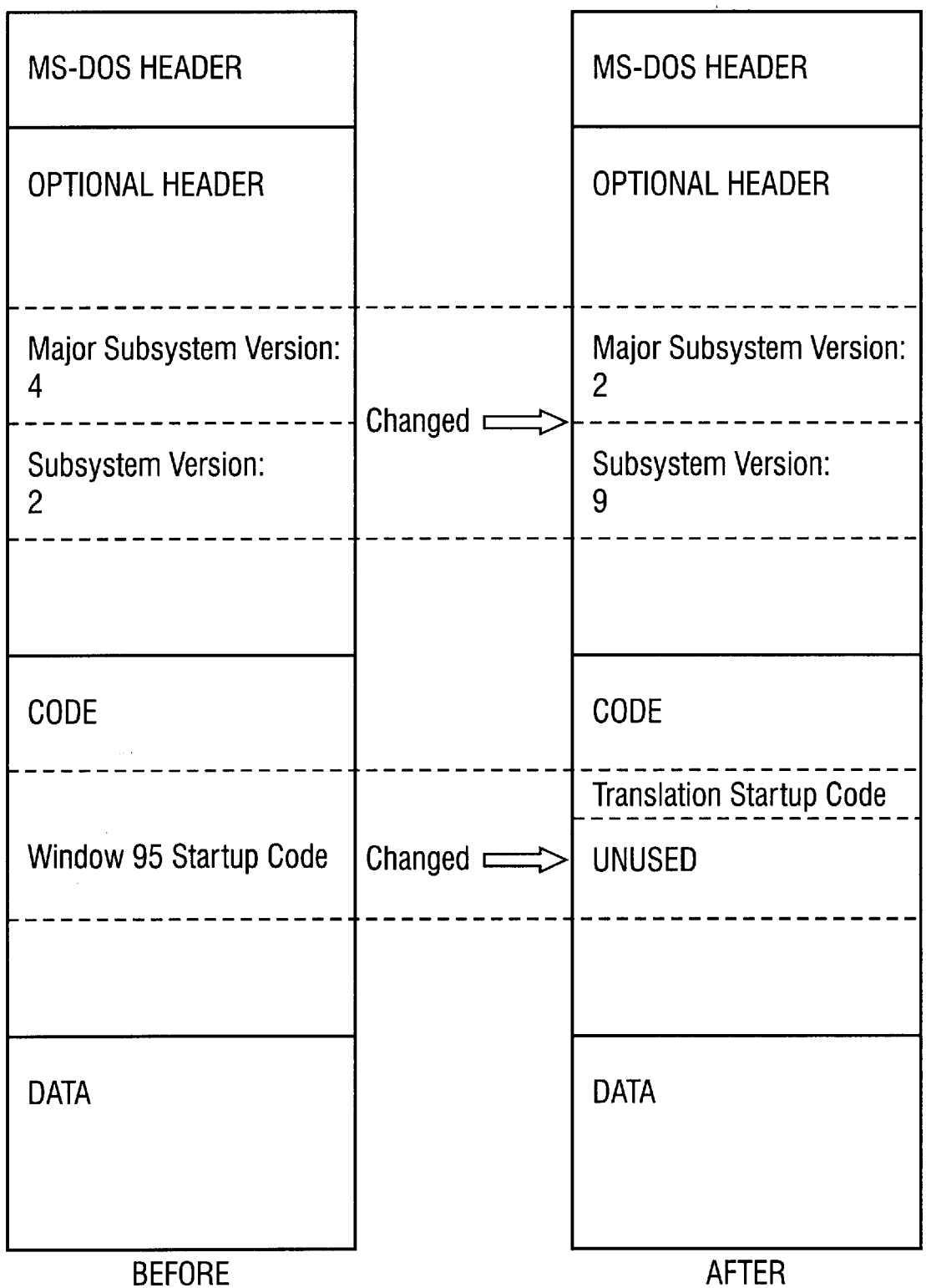
FIG. 10 is a diagram showing the translation of a DLL file by the file filter.

Returning to FIG. 5, if the application includes a DLL file as indicated in diamond 106, the file header is reformed to the proper Windows® CE equivalent as indicated in block 66 and as illustrated in FIG. 10. Since the loader already knows how to relocate the DLLs (the load address is never guaranteed), it is much easier to translate the DLLs from the Win9X to the Windows® CE environment. Win9X DLLs already contain tables that indicate each pointer in the file that needs to be relocated. Thus, it is unnecessary to modify the addresses by the paging mechanism described in FIG. 7.

The startup code within the DLL must be replaced (block 80) to get the Win9X DLLs to load under Windows® CE. This startup code gets called by the operating system and executes before the DLLMain entry point within the DLL is called. DLLMain is called by the operating system the first time the DLL is mapped into a process's address space. Fortunately, the startup code does not have to deal with modifying any addresses since this has already been dealt with by the loader. This means that the startup code must call the DLLMain function and then return. A parameter is passed indicating why the system is calling a DLL function. DLLMain may perform the initialization required for a given process by functions contained within the DLL.

If a DLL is involved, the file is copied to the Windows® CE device as indicated in block 108 and in FIG. 10. Similarly after reforming the file header (block 66) and changing the startup code 80 (and see FIG. 9), the file is copied to the Windows® CE device as indicated in block 108.

As indicated in diamond 110, in a parallel process, a check determines whether there are other associated DLLs that need to be processed. The executables may be scanned to determine which DLLs will be needed. These DLLs are collected and sent to block 64 for processing, as indicated at 112.

Figure 6:
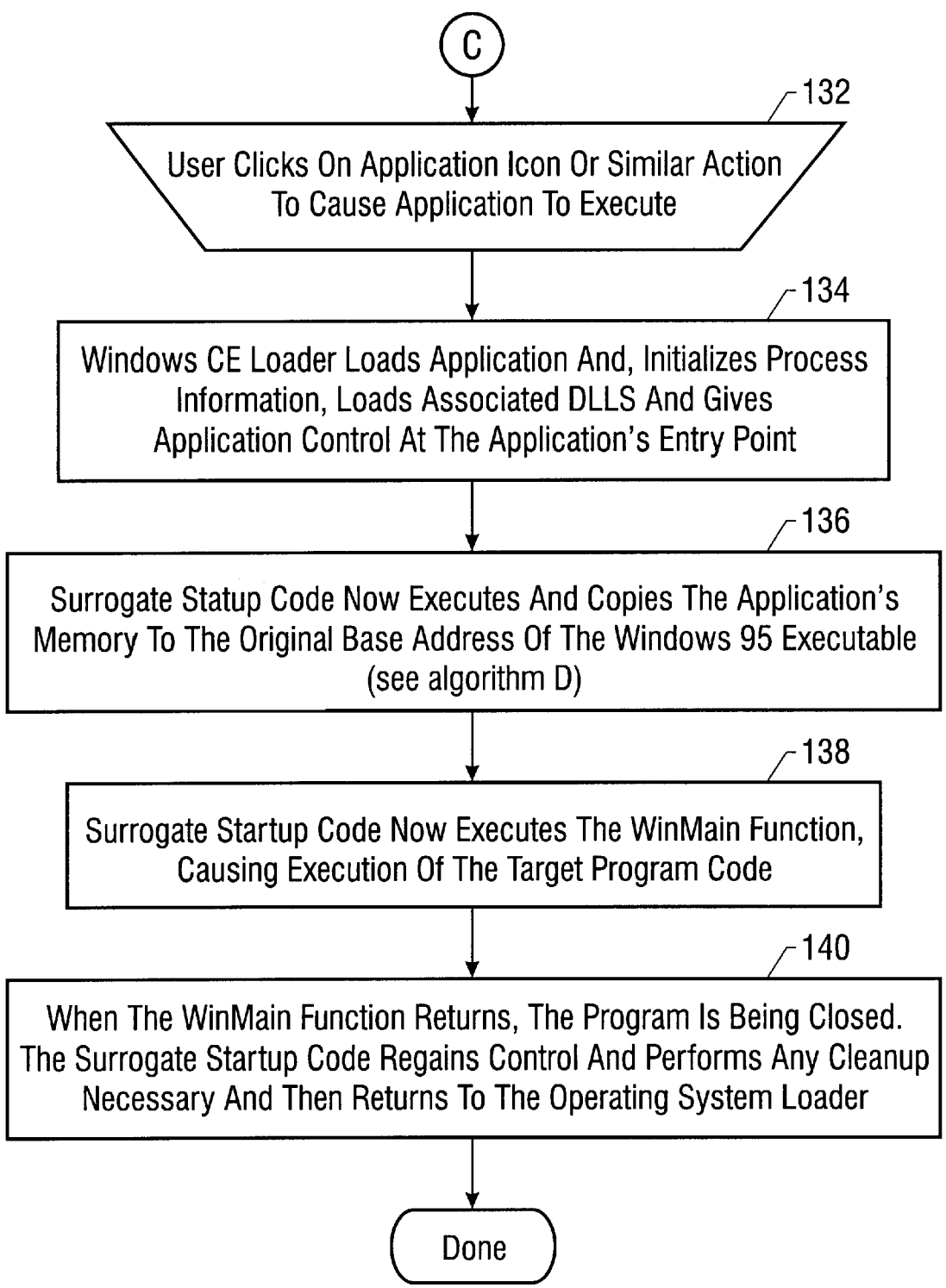
FIG. 6 is a flow chart showing how to load and execute an application in the embodiment of FIG. 5.

Referring now to FIG. 6, the application is loaded and executed when the user clicks on the application icon or otherwise causes the application to execute as indicated at 132. The Windows® CE loader loads the application and initializes process information, loads associated DLLs and gives application control at the application's entry point, as indicated at block 134. The surrogate startup code now executes and copies the application's memory to the original base address of the Win9X executable, as indicated in block 136.

The surrogate startup code executes the WinMain function causing execution of the target program code, as illustrated in block 138. When the WinMain functions return, the program is being closed. The surrogate startup code regains control and performs any cleanup necessary and then returns to the operating system loader, as shown in block 140.

Figure 11:
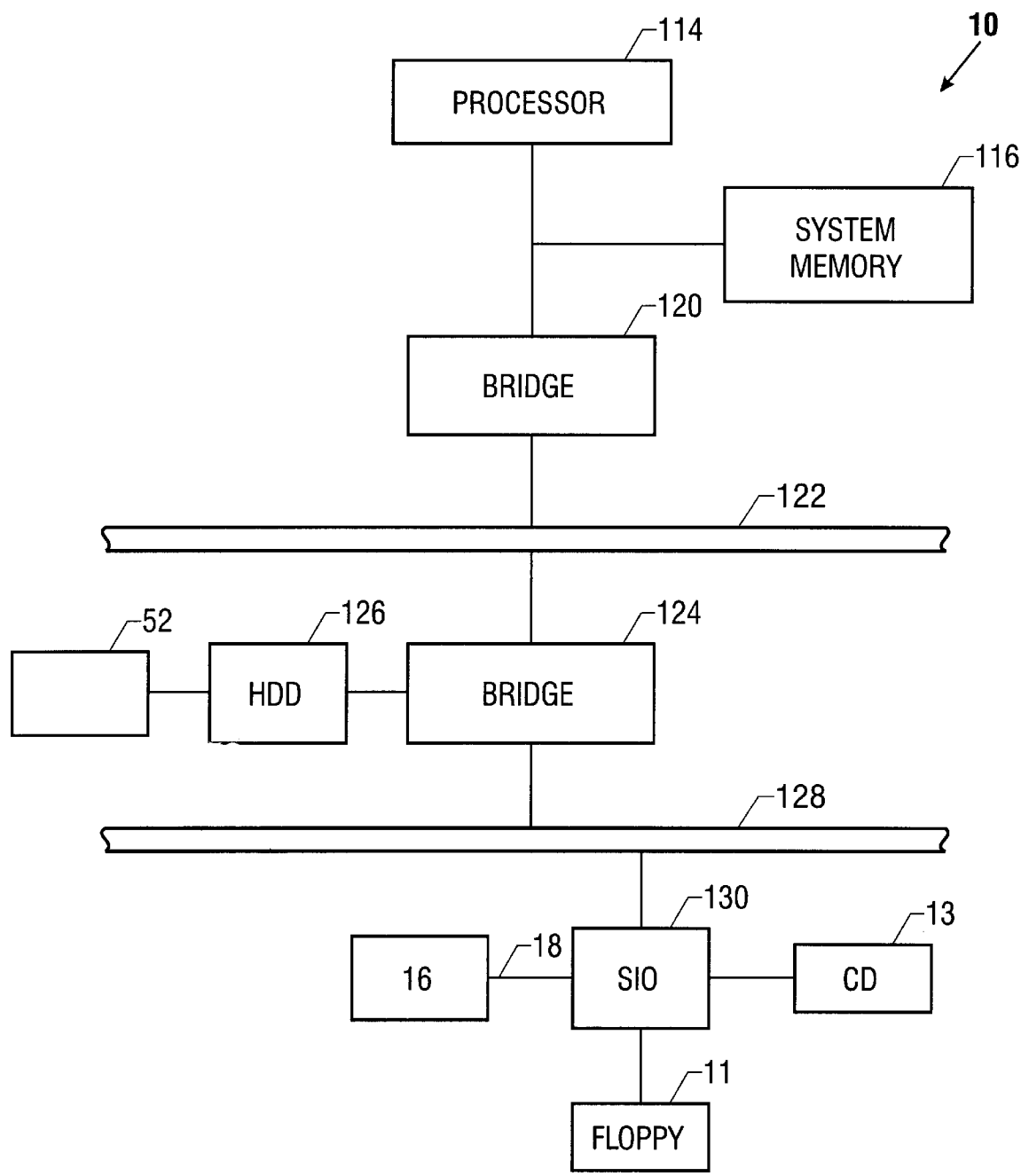
FIG. 11 is a block diagram showing the computer system 10 of FIG. 1.

Referring now to FIG. 11, the computer system 10 includes a processor 114 with system memory 116. The processor 114 is coupled to a bridge 120 which is in turn coupled to a bus 122. The bus 122 is coupled to a bridge 124. The bridge 124 may be coupled to a hard disk drive 126 which may store the software 52.

The bridge 124 is also coupled to a bus 128 which supports the serial input/output device 130. The device 130 may couple the compact disc drive 13, the floppy drive 11, and the computer system 16 through the serial cable 18.

While the present invention has been described with to a limited number of embodiments, those skilled in the art will appreciate numerous modifications and variations therefrom. It is intended that the appended claims cover all such modifications and variations that fall within the true spirit and scope of the present invention.

What is claimed is:

1. A method for converting software having source code to run on different operating systems comprising:
   loading the software on a first computer system having a first non-Windows® CE operating system;
   translating the software to run on a second computer system having a Windows® CE operating system by creating a translation layer on a first computer system, said translation layer communicating with said non-Windows® CE system using a non-Windows® CE system calling convention and communicating with said Windows® CE system using a Windows® CE system calling convention; and
   transferring said software to the second computer system running a Windows® CE operating system.

2. The method of claim 1 further including creating a first image of the software and a virtual copy of that image at different memory addresses.

3. The method of claim 1 further including creating a translation layer that makes calls for one operating system compatible with a second operating system.

4. The method of claim 1 further including defining a virtual device drive on the one operating system, recording registry entries which are used when a user attempts to install an application to the virtual device drive, and transferring said registry entries to the second operating system.

5. The method of claim 1 wherein translating includes parsing executable and dynamic link libraries and using separate filters to translate each of these different file types.

6. The method of claim 5 wherein translating includes modifying the header of a file using an executable filter so that the second operating system recognizes the file as a valid file for the second operating system.

7. The method of claim 6 wherein translating includes changing executable startup code to simulate standard startup code of the second operating system.

8. The method of claim 5 including modifying a header of a dynamic link library file so that the second operating system recognizes the file as a valid file for the second operating system.

9. The method of claim 8 further including changing executable startup code of the dynamic link library to simulate standard startup code for the second operating system.

10. The method of claim 1 wherein translating includes using a conversion layer which contains surrogate application program interfaces necessary to run a non-Windows® CE operating system.

11. An article comprising a medium for storing instructions that cause a computer to:
   load software on a first computer system having a non-Windows® CE operating system;
   translate the software to run on a second computer system having a Windows® CE operating system, by creating a translation layer on a first computer system, said translation layer communicating with said non-Windows® CE system using a non-Windows® CE system calling convention and communicating with said Windows® CE system using a Windows® CE system calling convention; and
   transfer said software to the second computer system.

12. The article of claim 11 including instructions that cause a computer to create a first image of the first computer system and a virtual copy of that image at different memory addresses.

13. The article of claim 11 further including instructions that cause a computer to create a translation layer that makes calls for one operating system compatible with a second operating system.

14. The article of claim 11 including instructions that cause a computer to parse executable and dynamic link libraries and use separate filters to translate each of these different file types.

15. The article of claim 11 including instructions that cause a computer to convert a non-Windows® CE operating system into a second operating system which is a Windows® CE operating system.

16. The article of claim 11 including instructions that cause a computer to use a surrogate translation layer which contains application program interfaces necessary to run a non-Windows® CE operating system.

17. A method for converting software designed to run on a non-Windows® CE system to run on a Windows® CE system comprising:

coupling said non-Windows® CE system and said Windows® CE system;

creating a translation layer on a first computer system, said translation layer communicating with said non-Windows® CE system using a non-Windows® CE system calling convention and communicating with said Windows® CE system using a Windows® CE system calling convention; and relocating virtual address space of the software so that an image of the software appears at two addresses.

18. The method of claim 17 wherein relocating includes using paging to relocate the image of the software to a second address.

19. The method of claim 17 wherein creating a translation layer includes providing surrogate KERNEL32.DLL, USER32.DLL and GDI32.DLL files.

20. The method of claim 17 further including parsing executables and dynamic link libraries in said software.

21. The method of claim 17 further including enabling said translation layer to convert between ASCII and unicode strings.

22. The method of claim 17 further including using a virtual program installation of the software on the non-Windows® CE system and recording registry entries created by the installation.

23. The method of claim 17 further including using a file filter to convert executables to a format suitable for the Windows® CE operating system.

24. A computer system comprising:

a processor; and a memory coupled to said processor, said memory storing software that translates software for non-Windows® CE system to run on a Windows® CE system by creating a translation layer on a first computer system, said translation layer communicating with said non-Windows® CE system using a non-Windows® CE system calling convention and communicating with said Windows® CE system using a Windows® CE system calling convention.

25. The system of claim 24 including a serial cable and a docking bay coupled to said serial cable, said docking bay adapted to receive a second computer system.

26. The system of claim 24 including a wireless connection to receive a second computer system.

27. A method of converting an application that runs on a non-window® CE operating system to run on a Windows® CE operating system comprising:

creating a translation layer adapted to work with both operating systems; and using a file filter to change application files for a non-Windows® CE operating system to operate on Windows® CE operating system.

28. The method of claim 27 further including identifying application files that are dynamic link libraries and files that are executables, and using said file filter to translate said files.

29. The method of claim 28 including reforming file headers of said executable files.

30. The method of claim 29 including changing start up code of said executable files.

* * * * *